United States Patent [19]

Costa

[11] 4,044,230

[45] Aug. 23, 1977

[54] PERFORATED TAPE READER

[75] Inventor: Armando Costa, Ivrea (Turin), Italy

[73] Assignee: Ing. C. Olivetti & C., S.p.A., Ivrea (Turin), Italy

[21] Appl. No.: 675,382

[22] Filed: Apr. 9, 1976

[30] Foreign Application Priority Data

May 12, 1975 Italy .................................. 68193/75

[51] Int. Cl.² ........................ G06K 7/04; H01H 43/08
[52] U.S. Cl. .............................. 235/61.11 C; 200/46
[58] Field of Search ................. 235/61.11 C, 61.11 R; 200/46

[56] References Cited

U.S. PATENT DOCUMENTS

| 3,304,410 | 2/1967 | Blodgett | 235/61.11 C |
| 3,683,156 | 8/1972 | King et al. | 235/61.11 C |

Primary Examiner—Daryl W. Cook

Attorney, Agent, or Firm—Schuyler, Birch, Swindler, McKie & Beckett

[57] ABSTRACT

In a perforated tape reader, the tape is sensed by detecting elements rotatable on one end of rocker arms. The other end of the rocker arms is provided with a fork. A flat spring urges on the upper arm of the fork and a conductive resilient element is engaged between the arms of the fork. When the detecting elements sense a perforation on the tape, the conductive element abuts against a fixed electric contact in a intermediate position between the arms of the fork; when the detecting elements sense no perforation the lower arm of the fork lifts the conductive element in order to open the electric contact.

Since the space between the arms of the fork is greater than the thickness of the conduction element, but less than the shifting of the fork, any small amplitude movements of the rocker arms in not transmitted to the conductive element.

2 Claims, 3 Drawing Figures

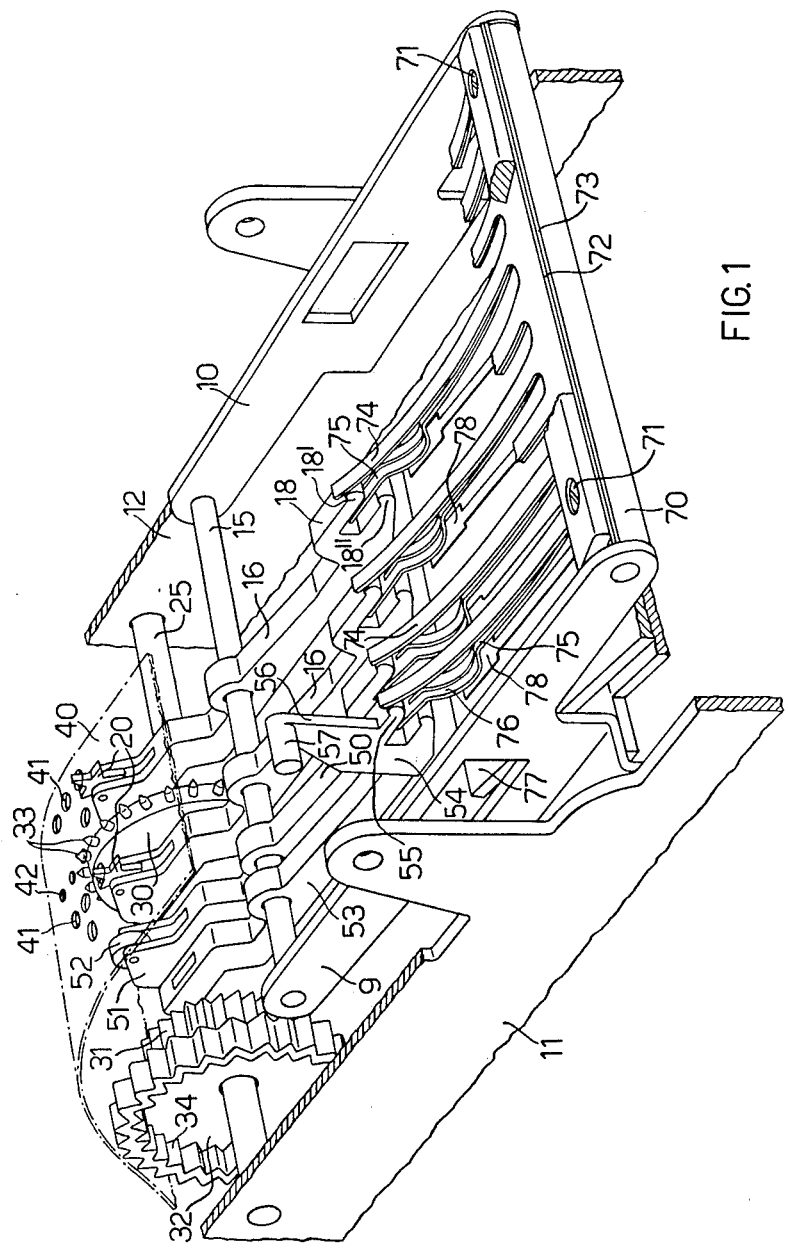

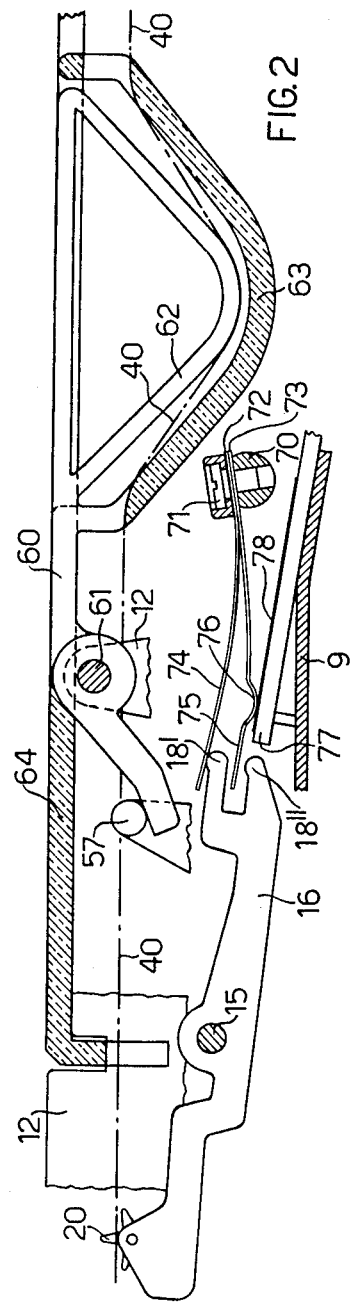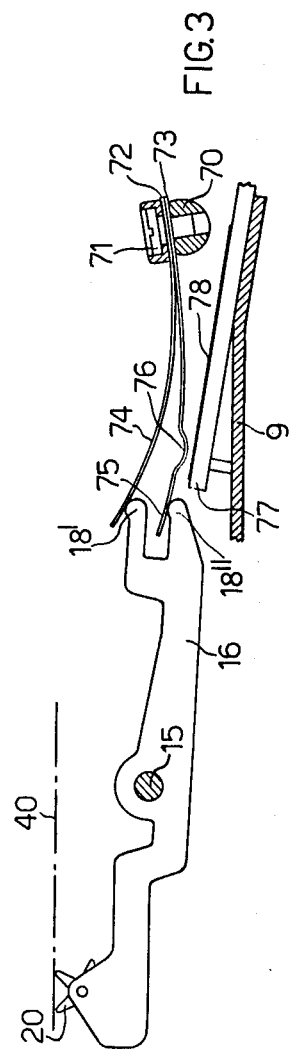

PERFORATED TAPE READER

BACKGROUND OF THE INVENTION

This invention relates to a perforated tape reader, wherein data is recorded in a plurality of longitudinal channels, by means of the presence or absence of perforations.

According to this invention, the device consists of drive means for moving said perforated tape in respect to a plurality of detecting elements associated with said perforated tape, a plurality of rocker arms pivoting on a fixed shaft, said detecting elements mounted on one of its ends and provided with a fork having an upper and a lower arm at the other end, a plurality of conducting elements selectively moved from a first to a second position of said rocker arms and designed to close electric circuits, a plurality of fixed contacts, located in correspondance with said plurality of conducting elements, elastic means associating with said rocker arms to keep said detecting elements in contact with said perforated tape.

In the already known device described in U.S. Pat. No. 3,733,467, the elements detecting perforations on perforated tape consist of star wheels pivotly mounted on one end of a plurality of lever arms, pivoting on a fixed pin.

Each lever arm is biased against the tape by means of a leaf spring. The leaf spring is the means used for closing the electric circuit for tape reading. In fact, when the point of the star wheel penetrates a perforation in the tape, the corresponding lever arm rotates in a counter-clockwise sense. The other end of the lever arm engages an adjustable set-screw 104 in FIG. 2, owing to the action of spring 100, which in its turn touches an electric contact 112 having an adjustable set-screw to close the electric reading circuit.

This device is very complex as it requires assembling as many springs as there are lever arms, that is as many perforations, plus any eventually other lever arms needed.

Furthermore, an extremely delicate and accurate initial adjustment is required as the set-screws and contact-screws have to be adjusted one at a time when they are assembled.

During operation, these screws may accidentally loosen thus altering data reading.

Another major inconvenience of this reading device is that the springs are directly connected to the respective lever arms, so that each movement of the latter is directly transmitted to the springs and thus any eventual rebound of the wheels against the perforated tape affects the springs, thus causing irregular contacts and consequently abnormal opening and closing of the electric reading circuit.

These anomalies cause irreparable incorrect reading of data contained in the tape.

SUMMARY OF THE INVENTION

The device according to the invention, comprises a plurality of star wheels rotatable on one end of arms for sensing the perforations on the tape. The other end of the rockers is provided with a fork for moving a plurality of conducting elements from a first to a second of two positions to close an electric circuit. A plurality of flat springs keep the star wheels in sensing position against the tape. The conducting elements are moved away from fixed in their first position contact by the lower arm of the fork, when the rocker arm is in said first position and are arrested against said fixed contacts and in an intermediate position between the arms of said fork, when the conducting elements are in the second position.

The characteristics peculiar to this invention will be clarified in the following description of a preferred embodiment, carried out as an unlimiting example and further illustrated by the attached drawings.

BRIEF DESCRIPTION OF THE DRAWINGS

FIG. 1 is a partial perspective view of the perforated tape reader device, according to the invention;

FIG. 2 is a partial longitudinal section of the device referred to in FIG. 1;

FIG. 3 is a view of a rocker arm of the device in FIG. 2 drawn in the second position.

DETAILED DESCRIPTION OF THE INVENTION

Referring to FIG. 1, according to the invention, the device is embodied in a metal casing consisting of two frames 9 and 10, which are then fitted to two side plates 11 and 12.

Rocker arms 16, having a forked end 18, pivot around shaft 15, fitted to frames 9 and 10.

Star wheels 20 projecting from the upper part, pivot around the other end of rocker arm 16.

Three pulleys 30, 31 and 32 are mounted on shaft 25 rotating on side plates 11 and 12.

The pulley 30 is provided with a plurality of equidistant pins 33 on its upper surface which project radially. Pulley 31 is provided with an external gear having saw teeth, with which a pivoting lever feed device is associated, not shown in the drawings, of a known type, for example the same as the one described in U.S. patent application No. 675,368 filed Apr. 9, 1976 in the name of the applicant.

Pulley 32 has an internal gear 34, flanged on the lateral side of the pulley itself, having the same pitch as pins 33, for positioning wheel 30, together with any known device for angular positioning.

A tape 40, perforated according to the known multiple channel technique, has a series of perforations 41 on parallel lines, longitudinally arranged, in alignment with wheels 20. A further perforation, in a median position, engages the pins 33 of pulley 30.

Next to rocker arms 16, other rocker arms are to be found on shaft 15, used for performing service functions, for example the detection of tape tension and testing the presence of the tape. In the reader device in FIG. 1, next to rocker arms 16, a rocker arm 50 is pivotally mounted on shaft 15, having a cylindrical wheel 52 pivotally mounted on the end of the rocker arm.

The rocker arm 50 with wheel 52 indicate the presence of the tape aligned with drive pulley 30.

The other arm of rocker arm 50 is provided with a fork which is identical to the fork 18 of rocker arms 16. A further rocker arm 53 is pivotally mounted on the shaft 15, one of its ends is provided with fork 55 which is identical to the fork 18 of lever arms 16. At the end 54 of rocker arm 53, a tongue 56, is also fitted, provided with a pin 57.

A rocker 60, FIG. 2, is pivotally mounted on pivot 61 integral with side frames 11 and 12, and is provided at one of its ends with a pressure element of a substantially prismatic form, having a transversal section of a triangular shaped rounded corners.

The rocker 60 is associated with the pin 57 at the other end. An element 62 is located in a fold 63 of cover 64, normally made of plastic or a similar type of material, located on side frames 11 and 12 for the purpose of protecting the tape. Fold 63, in particular, has a similar shape to element 62. Perforated tape 40 passes between the element 62 and the fold 63 so that as long as tape tension, kept taut by pulley 30, does not exceed a fixed value, the weight of element 62 forces the perforated tape to follow the path indicated in FIG. 2, but as soon as tension on the tape increases the element 62 is lifted from the tape itself, lever 60 rotates in a counter-clockwise sense and rocker arm 53 consequently rotates in a clockwise sense.

On crosspiece 70, fitted to the two frames 9 and 10, a pair of superimposed plates are fitted by pressure by means of screws 71. The upper plate 72 is made of steel for springs and the lower plate 73 is made of a resilient metal which conducts electricity, for example an alloy of a known type of phosphorous bronze.

Both upper plate 72 and lower plate 73 extend towards forks 18 of rocker arms 16, 50 and 53 with a plurality of separate blades 74 and respectively 75. The ends of each of the blades 74 are located on the external side of upper arm 18' of forks 18, while the end of each of the blades 75 are located on the inside of forks 18. The two arms 18' and 18" of forks 18 are spaced by a quantity exceeding the thickness of blades 75, so that small movements made by rocker arms 16, 50 and 53 do not affect the corresponding blades 75, as will be further explained later. Blades 75 have a bulge 76 near their ends located within forks 18.

A blade made of insulating material 77 is fitted to the frames 9 and 10, below blades 74 and 75 are aligned with the bulges 76. Blade 77 is supplied with metal areas 78 inserted with the known technique of printed circuits.

Consequently, when one of the star wheels is located against the tape when perforations are absent, the corresponding lever arm is rotated in a counter-clockwise sense, in contrast to the effect of flat-spring 74 (FIG. 3). In this position, metal strip 75 is held lifted from lower arm 18" of fork 18 in respect to blade 77.

As soon as one of the points of star wheel 20 encounters a perforation in the tape, lever arm 16 is rotated in a clockwise sense by the action of flat spring 74 (FIG. 3). In this position, metal strip 75 is held lifted from lower arm 18" by fork 18 in respect to the blade 77.

The rotation of lever arm 16 is limited by the length of the points of star wheel 20, and the relationship of the arms of rocker arm 16 in respect to shaft 15 is such that the two arms 18' and 18" of fork 18 are arranged symmetrically (FIG. 2) in respect to the end of metal strip 75 when the latter rests on blades 77.

In this position, any small amplitude movements of rocker arm 16 in respect to the reciprocal distance of arms 18' and 18" do not interfere with metal strip 75 which keeps the electric contact with area 78 firmly closed.

Consequently, this configuration ensures the independence of the position of metal strips 75 from any abnormal vibrations of rocker arm 16, for example vibrations which are caused by rebounds coming from star wheel 20 when it encounters a perforation on the perforated tape.

It is understood that the device concerned in this invention can be modified, added to or have parts replaced without departing from the spirit and the scope of the invention as defined in the appended claims.

What I claim is:

1. A perforated tape reader comprising a plurality of detecting means associated with said perforated tape, driving means for moving said tape with respect to said detecting means, a plurality of movable rocker arms said detecting means having means rotatably mounting at one end thereof and wherein the other end has a fork having an upper and a lower arm, a plurality of conductive elements selectively movable from a first to a second of two positions by said rocker arms for closing electric circuits, a plurality of fixed contacts located in alignment with said plurality of conductive elements, means associated with said rocker arms to normally keep said detecting means in contact with said perforated tape, whereby said conductive elements associated with said lower arms of said fork are moved away from said fixed contacts when they are in said first position and are arrested against said fixed contacts in an intermediate position between said arms of said fork when said conductive elements are in said second position in order to close said electric circuits 2. A reader as claimed in claim 1, in which the space between said upper arm and said lower arm of said fork exceeds the thickness of said conductive elements but it is less than the shifting between said first position and said second position of said rocker arms.

* * * * *